United States Patent [19]
Massey et al.

[11] Patent Number: 5,522,108
[45] Date of Patent: Jun. 4, 1996

[54] DOCK LEVELER HAVING A RAMP MOVABLE TO A RAISED POSITION BY INFLATION OF AN INFLATABLE MEMBER, WITH A FILLER FOR OCCUPYING VOLUME WITHIN THE INFLATABLE MEMBER

[75] Inventors: Douglas H. Massey, New Berlin, Wis.; Bruce Winter, Hudson, N.Y.

[73] Assignee: Kelley Company, Inc., Milwaukee, Wis.

[21] Appl. No.: 381,083

[22] Filed: Jan. 31, 1995

[51] Int. Cl.⁶ .................................................. E01D 18/00
[52] U.S. Cl. ............................. 14/71.7; 14/69.5; 14/71.3; 254/93 HP; 254/93 H
[58] Field of Search ........................... 14/71.1, 71.3, 14/71.5, 71.7, 69.5; 254/1, 89 H, 89 R, 93 HP; 5/451; 410/119, 125

[56] References Cited

U.S. PATENT DOCUMENTS

| | | |
|---|---|---|
| 2,495,092 | 1/1950 | Cox et al. . |
| 2,610,824 | 9/1952 | Grier . |
| 2,804,118 | 8/1957 | Bayerkohler . |
| 3,012,804 | 12/1961 | Jeavons . |
| 3,117,332 | 1/1964 | Kelley et al. . |
| 3,211,425 | 10/1965 | Greulich et al. . |
| 3,521,861 | 7/1970 | Freudenthal et al. . |
| 3,528,118 | 9/1970 | Smith . |
| 3,659,899 | 5/1972 | Phillips et al. .................. 298/22 R |
| 3,685,077 | 8/1972 | Wiener et al. ....................... 14/71 |
| 3,711,157 | 1/1973 | Smock ................................. 298/8 R |
| 4,012,804 | 3/1977 | Catlett .................................. 14/71.3 |
| 4,081,874 | 4/1978 | Artzberger ......................... 14/71.1 |
| 4,293,969 | 10/1981 | Frommelt ........................... 14/71.1 |
| 4,343,058 | 8/1982 | Loblick ............................... 14/71.1 |
| 4,538,311 | 9/1985 | Hall et al. ............................... 5/451 |
| 4,572,579 | 2/1986 | Saito ...................................... 298/1 |
| 4,688,760 | 8/1987 | Garman et al. ............... 254/93 HP |
| 4,786,032 | 11/1988 | Garman et al. ............... 254/93 HP |
| 4,955,923 | 9/1990 | Hageman ........................... 14/71.1 |
| 5,042,103 | 8/1991 | Megens ............................... 14/71.1 |

FOREIGN PATENT DOCUMENTS

| | | |
|---|---|---|
| 0386850 | 9/1990 | European Pat. Off. . |
| 835142 | 5/1960 | United Kingdom . |
| 9313267 | 7/1993 | WIPO . |
| WO-A-93 13267 | 7/1993 | WIPO . |

Primary Examiner—Ramon S. Britts
Assistant Examiner—Pamela A. O'Connor
Attorney, Agent, or Firm—Michael, Best & Friedrich

[57] ABSTRACT

A dock leveler including a ramp is movable to a raised position by inflation of an inflatable member, such as an air bag assembly. One or more filler members are located within an internal cavity defined by the air bag assembly, to occupy void volume therein. The filler members expedite inflation of the bag assembly when an inflating device is operated to introduce air under pressure into the bag assembly. The filler members also function to maintain the bag assembly in an engaged condition with the underside of the ramp, and to prevent the air bag assembly from fully collapsing in order to prolong bag life.

18 Claims, 1 Drawing Sheet

5,522,108

DOCK LEVELER HAVING A RAMP MOVABLE TO A RAISED POSITION BY INFLATION OF AN INFLATABLE MEMBER, WITH A FILLER FOR OCCUPYING VOLUME WITHIN THE INFLATABLE MEMBER

BACKGROUND AND SUMMARY OF THE INVENTION

This invention relates to a dock leveler, and more particularly to a dock leveler having a ramp movable to a raised position by inflation of an inflatable member disposed below the ramp.

In accordance with known construction, a dock leveler typically includes a ramp for bridging the space between a loading dock and the bed of a truck or other carrier parked adjacent the loading dock. The ramp is movable between a horizontal rest position and an inclined raised position. A lip is mounted to the outer end of the ramp, and is disposed in a pendant inoperative position when the ramp is in its rest position. After the ramp is moved to its raised position, the lip is moved to an extended position and engages the truck bed upon subsequent downward movement of the ramp to support the outer end of the ramp.

Recent developments in dock leveler technology have involved utilizing an inflatable member, such as an airbag, to lift the ramp to its raised position. Copending U.S. patent application Ser. Nos. 08/131,981 filed Oct. 4, 1993 and 08/131,983 filed Oct. 4, 1993, disclose dock levelers of this type, and the disclosures of these applications are hereby incorporated by reference.

The inflatable member or airbag is inflated using an inflating device, which can be any source of pressurized air. In one form, a fan or blower is mounted to the airbag support or to the ramp, and supplies low-pressure air to the interior of the airbag assembly to inflate the airbag assembly and to raise the ramp. As can be appreciated, when the fan or blower is operated, it has in the past been necessary to supply a sufficient quantity of air to the interior of the airbag assembly to completely occupy the entire volume defined by the interior of the airbag assembly in order to introduce sufficient pressure to the air to raise the ramp. This required the fan or blower to operate for several seconds without any movement whatsoever of the ramp, before the airbag assembly was filled with a sufficient quantity of pressurized air to commence lifting of the ramp.

In addition, the airbag assembly is typically constructed such that, when pressurized air is removed from the interior of the airbag assembly, the airbag assembly moves to a collapsed position under its own weight. This created a space below the ramp between the upper surface of the airbag assembly and the underside of the ramp. This space could collect debris or other objects, creating the potential for puncturing the airbag upon inflation of the airbag and engagement with the underside of the ramp.

It is an object of the present invention to provide a means for expediting filling of the inflatable member of a dock leveler with air upon operation of an inflating device. It is a further object of the invention to provide such a means which does not affect the overall structure or construction of either the inflatable member or any other component of the dock leveler. A still further object of the invention is to provide a means for maintaining the inflatable member in engagement with the underside of the ramp in order to eliminate the space between the bag and the ramp in which debris or other objects can collect.

In accordance with the invention, a dock leveler assembly includes a ramp movable to a raised position from a lowered position, an inflatable member located below the ramp, an inflating device interconnected with the inflatable member for introducing air into the interior of the inflatable member to raise the ramp, and a filler member located within the interior of the inflatable member. The filler member functions to maintain the inflatable member in a non-collapsed condition, in order to reduce the amount of air which must be introduced into the inflatable member in order to inflate the inflatable member and raise the ramp. The filler member may take any satisfactory form. In one embodiment, the filler member is constructed of a resilient foam material, which is placed into the interior of the inflatable member upon assembly of the inflatable member. The foam filler prevents the inflatable member from collapsing, thus, retaining air therewithin which would otherwise be exhausted if the inflatable member were to collapse. This functions to significantly reduce the volume of air which must be introduced into the inflatable member in order to raise the ramp. In an application where the inflatable member is not secured to the underside of the ramp, the filler member is constructed so as to maintain the upper portion of the inflatable member in contact with the underside of the ramp when the ramp is in its rest or operative position, in order to prevent debris or other objects from coming between the ramp and the inflatable member. In an arrangement in which the inflatable member has more than one chamber, a filler member is placed in each chamber of the inflatable member to prevent each member from collapsing and to prevent the upper portion of the inflatable member from blocking openings communicating between the chambers.

The invention further contemplates a method of expediting filling of an inflatable member in a dock leveler, or in any other assembly having a member which is movable to form one position to another in response to filling an inflatable member with air. The method of the invention is substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
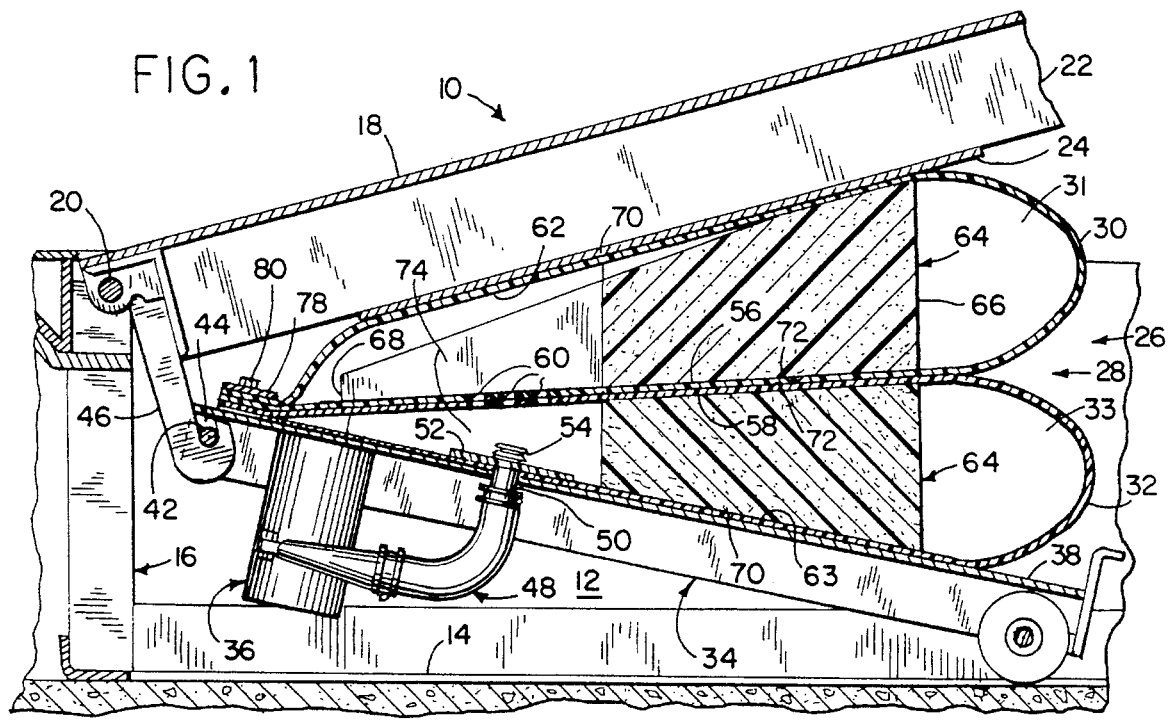
FIG. 1 is a partial vertical section view of a dock leveler assembly in which the ramp is raised upon inflation of an airbag assembly, and incorporating filler members for expediting inflation of the bag assembly in accordance with the present invention.

Referring to FIG. 1, a dock leveler 10 is mounted in a pit or depression 12 in a loading dock. The lower surface or floor 14 of pit 12 slopes downwardly and forwardly, in a conventional manner. Dock leveler 10 is adapted to bridge the gap between the upper surface of the loading dock and the bed of a truck or carrier parked in front of the loading dock, to facilitate loading or unloading of the truck or carrier.

Figure 3:
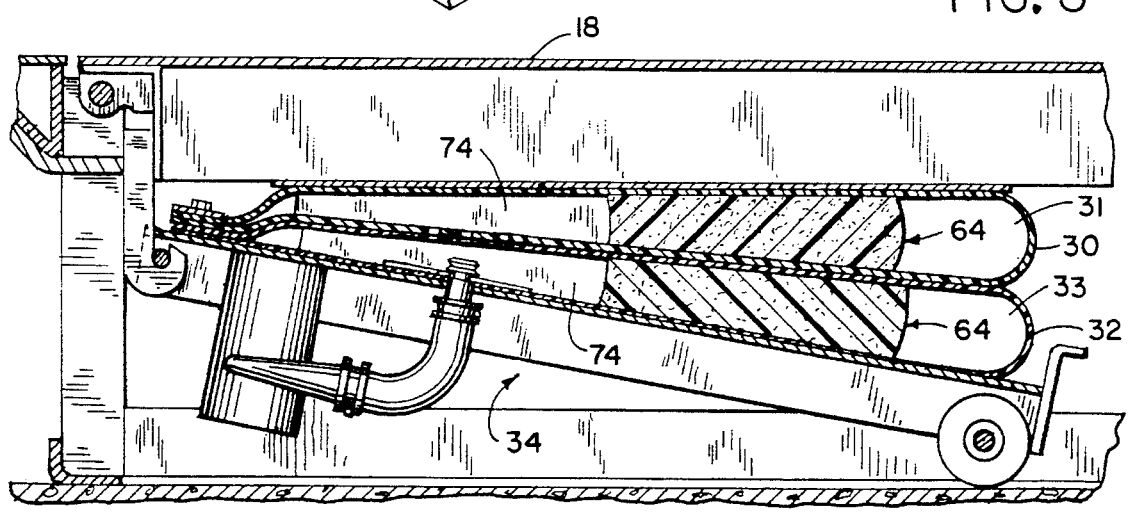
FIG. 3 is a view similar to FIG. 1 showing the dock leveler ramp in a lowered position and compression of the filler members.

Dock leveler 10 includes a frame or supporting structure 16 mounted in pit 12, and the rear end of a ramp or deck plate 18 is pivotably mounted to the upper end of frame 16 via one or more pins 20, again in a conventional manner. Ramp 18 is movable between a generally horizontal dock level position as shown in FIG. 3, in which ramp 20 is flush and substantially coplanar with the upper surface of the loading dock, and an upwardly inclined raised position as shown in FIG. 1.

In a conventional manner, an extension lip (not shown) is hinged to the forward end of ramp 18 via hinge pins or the like. The extension lip is pivotable from a pendant position to an outwardly extending position via a lip extension mechanism which is actuated when ramp 18 is moved to its raised position of FIG. 1 and then lowered. When the lip is moved to its outwardly extending position, the lip is coplanar with ramp 18, forming an extension to ramp 18. The lip is moved from its pendant position to its extended position by any satisfactory conventional mechanism, and comes to rest on the bed of the truck or carrier upon downward movement of the ramp from its raised position of FIG. 1 to its horizontal dock level position of FIG. 3.

Ramp 18 is mounted to a series of beams 22 which extend in a longitudinal front-rear direction between the forward and rearward ends of ramp 18. A downwardly facing pressure plate 24 extends across beams 22 toward the rearward ends of beams 22, and is mounted against beams 22 in any satisfactory manner such as by bolting, welding or the like.

A lifting assembly 26 is disposed between plate 24 and pit floor 14 and includes an inflatable member or bag assembly 28 including an upper bag 30 defining an internal cavity 31 and a lower bag 32 defining an internal cavity 33. Bags 30, 32 are vertically superimposed, with bag 30 overlying bag 32. Lifting assembly 26 further includes a bag support assembly 34 and an inflating device in the form of a fan or blower 36. Bag support 34 includes a support plate 38 defining an upper surface engaging the lower wall of lower bag 32 and a series of wheels 40 mounted to the forward end of bag support 34 and engaged with pit floor 14. A pin or shaft 42 is provided at the rearward end of bag support 34, and is received within a series of upwardly facing slots 44 formed in bracket members 46 extending downwardly from the rearward end of ramp 18.

Fan 36 is mounted to a lower surface defined by support plate 38 or, in any other satisfactory location, and a pipe assembly 48 extends between the discharge of fan 36 and the interior of lower bag 32. Alternately, pressurized air can be supplied to bag assembly 28 from any satisfactory source, such as pressurized shop air. Pipe assembly 48 includes a discharge nipple 50 which extends through aligned openings formed in support plate 38 and in the lower wall of lower bag 32, with nipple 50 having its end disposed within internal cavity 33 of lower bag 32. Nipple 50 is provided with outer barbs 54 which engage a flexible molded mounting ring 52, such as flexible PVC, secured to the lower wall 63 of lower bag 32.

The construction of bag assembly 28 is illustrated and described in copending U.S. patent application Ser. No. 08/131,981 filed Oct. 4, 1993. Bags 30, 32 are preferably formed of fabric coated with a thermoplastic resin. Bags 30, 32 have contiguous horizontal walls 56, 58, respectively, in which aligned openings 60 are formed to establish communication between the internal cavities 31, 33 of bags 30, 32, respectively.

The upper surface of upper bag 30, defined by an upper wall 62, bears against pressure plate 24 and the lower surface of lower bag 32, defined by a lower wall 63, bears against support plate 38, for raising ramp 18 to its raised position of FIG. 1, as will be explained.

Filler members 64 are located within internal cavity 31 defined by upper bag 30 and internal cavity 33 defined by lower bag 32, respectively. Filler members 64 are wedge-shaped, with each defining a front surface 66, a rear surface 68, a top surface 70 and a bottom surface 72. Front surface 66 has a height significantly greater than rear surface 68. Filler members 64 are constructed so as to occupy a majority of the volume defined by bag internal cavities 31, 33.

Filler members 64 each include a cut-out 74 extending between lower surface 72 and upper surface 70 forwardly from rear surface 68. Each cut-out 74 extends throughout the central portion of rear wall 68. Cut-outs 74 are in communication with the discharge of outlet nipple 50, and with openings 60 in bag walls 56, 58.

Filler members 64 are placed into cavities 31, 33 before the rear ends of bag walls 56, 58, 62 and 63 are brought into overlying relationship with each other adjacent the rearward end of support 34 by folding the material of bags 30 and 32, at which time fillers 64 are secured within cavities 31 and 33. The rear ends of bag walls 56, 58, 62 and 63 are then secured to support plate 38 using a clamp bar 78 and a series of bolts 80 and associated nuts, or by any other satisfactory mounting method.

Figure 2:
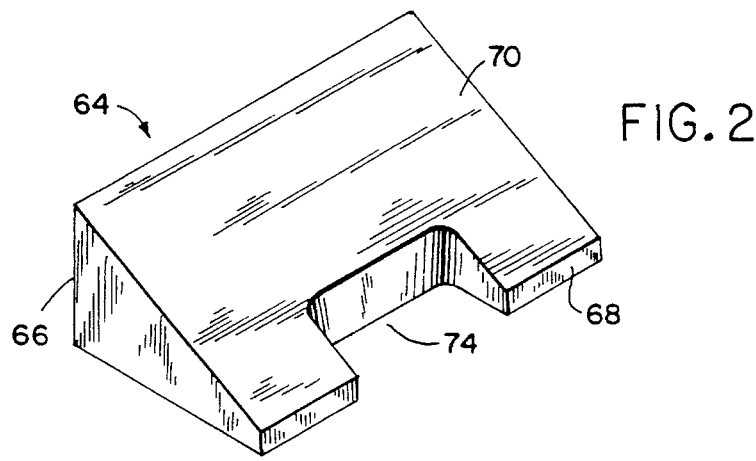
FIG. 2 is an isometric view of a member for placement into the interior of the bag assembly for the dock leveler assembly of FIG. 1.

FIG. 2 illustrates a filler 64 prior to placement within bag cavities 31 and 33. Filler 64 is preferably formed from a block of resilient, compressible open cell foam material.

In operation, dock leveler 10 and filler members 64 function as follows. When ramp 18 is in its atrest position not supported by bag assembly 28, in which ramp 18 can either be in a horizontal position or a non-horizontal position, filler members 64 maintain airbag assembly 28 in a raised, non-collapsed position in which bottom wall 63 of lower bag 32 in engagement with support plate 38 and the forward end of upper bag 30 top wall 62 is in engagement with the lower surface of pressure plate 24. In this manner, there is no gap or space defined between bag upper wall 62 and pressure plate 24, which could otherwise catch debris or other objects which could puncture bag 30 upon inflation. Bag assembly 28 is then inflated by operation of fan 36 or other means, during which air is introduced into the interior of lower bag 32 through the discharge of outlet nipple 50. Such air is received in cut-out 74 of lower bag 32, and then passes through openings 60 into upper bag 30. Bags 30 and 32 are then fully inflated by continued operation of blower 36, to lift ramp 18 by engagement of bag assembly 28 between support plate 38 and pressure plate 24 and by pressured air within internal cavities 31, 33. Fillers 64 reduce the idle time which would otherwise be necessary to inflate air bag assembly 28 from its collapsed position, thus substantially expediting the raising of ramp 18. Once ramp 18 is fully raised, operation of fan 36 is discontinued and ramp 18 is lowered to its FIG. 3 position in which the lip mounted thereto is supported by the truck bed. During such lowering of ramp 18, air is exhausted through fan 36, and filler members 64 are compressed to the position as shown in FIG. 3. At all times, filler members 64 function to prevent bags 30 and 32 from fully collapsing, thus preventing bags 30 and 32 from folding and to thereby prolong bag life.

Upon subsequent inflation of bags 30, 32, filler members 64 return to their expanded condition as shown in FIG. 1 due to the resiliency of the material making up filler members 64.

It is understood that air bag assembly 28 could be in any form of inflatable member and have any number of chambers, and that any form of filler member could be used to keep the inflatable member from collapsing and to expedite inflation of the inflatable member.

It is further understood that any void-occupying structure could be used in place of foam filler members 64, and that the invention contemplates numerous other embodiments not specifically shown or discussed.

Various alternatives and embodiments are contemplated as being within the scope of the following claims particularly pointing out and distinctly claiming the subject matter regarded as the invention.

We claim:

1. In a dock leveler including a ramp movable between a lowered position and a raised position, an inflatable member located below the ramp for moving the ramp to its raised position upon inflation of the inflatable member, the inflatable member including an internal cavity and being collapsable, and a selectively operable inflating arrangement for introducing pressurized air to the internal cavity of the inflatable member, the improvement comprising a filler member located within the inflatable member internal cavity, said filler member maintaining opposing walls of said inflatable member in spaced relation to each other to thereby maintain an air space between said opposing walls.

2. The improvement of claim 1, wherein the inflatable member comprises an airbag assembly having an upper chamber and a lower chamber, and wherein a filler member is located within each of the upper and lower chambers.

3. The improvement of claim 2, wherein the airbag assembly includes a wall interposed between the upper and lower chambers and one or more openings formed in the wall for establishing communication between the upper and lower chambers, and wherein the filler member includes an opening in alignment with the one or more openings.

4. The improvement of claim 1, wherein the inflatable member includes a wall having an inlet into which pressurized air is supplied upon operation of the inflating device, and wherein the filler member is in engagement with the wall and includes an opening disposed in alignment with the inlet.

5. The improvement of claim 1, wherein the filler member is formed of a foam material.

6. The improvement of claim 5, wherein the inflatable member internal cavity is defined by a pair of spaced walls, wherein the walls are arranged so as to be farther apart at a first end of the cavity than at an opposed second end, and wherein the filler member comprises a wedge-shaped piece of foam material having a reduced end located toward the first end of the cavity and an enlarged end located toward the second end of the cavity.

7. The improvement of claim 1, wherein the dock leveler includes a surface engageable by the inflatable member where the inflatable member is inflated to raise the ramp, and wherein the filler member functions to maintain the inflatable member in contact with the surface.

8. For a dock leveler including a ramp movable to a raised position by operating an inflating device to fill an inflatable member with air, a method of expediting filling of the inflatable member with air, comprising placing a filler member in the inflatable member, said filler member maintaining opposing walls of said inflatable member in spaced relation to each other to thereby maintain an air space between said opposing walls.

9. The method of claim 8, wherein the inflatable member comprises an airbag formed from a sheet of folded material having a first seamless end defined by the fold of the material and a second end defined by overlying end portions of the sheet of material, and wherein the step of placing a filler member in the inflatable member comprises placing the filler member on a surface of the sheet of material, folding the sheet of material over the filler member, and subsequently securing the overlying end portions of the sheet of material together.

10. The method of claim 8, wherein the step of placing a filler member in the inflatable member comprises placing a filler member constructed of a foam material within the inflatable member.

11. The method of claim 8, wherein the inflatable member includes an inlet for communicating air to the interior of the inflatable member, and further comprising forming an opening in the filler member such that the opening is disposed in alignment with the inlet.

12. A dock leveler assembly, comprising:

a ramp movable to a raised position from a lowered position;

an inflatable member located below the ramp;

an inflating device interconnected with the inflatable member for introducing air into the inflatable member to raise the ramp; and a filler located within the inflatable member, said filler member maintaining opposing walls of said inflatable member in spaced relation to each other to thereby maintain an air space between said opposing walls.

13. The dock leveler assembly of claim 12, wherein the ramp defines a downwardly facing surface with which the inflatable member is engageable to move the ramp to its raised position upon operation of the inflating device to inflate the inflatable member.

14. The dock leveler assembly of claim 13, further comprising a support spaced below the downwardly facing surface of the ramp, wherein the inflatable member is disposed between the support and the downwardly facing surface, and wherein the filler functions to maintain the inflatable member in a position in which the inflatable member substantially fills the space between the support and the downwardly facing surface to prevent entry of debris or other objects between the inflatable member and the ramp downwardly facing surface.

15. The dock leveler assembly of claim 14, wherein the filler functions to maintain an upper surface of the inflatable member in engagement with the ramp downwardly facing surface.

16. The dock leveler assembly of claim 14, wherein the inflatable member includes an upper chamber and a lower chamber, and wherein a filler is located within each of the upper and lower chambers.

17. In an assembly including a member movable between first and second positions in response to introduction of pressurized air from an inflating device to an internal cavity defined by an inflatable member, the improvement comprising a filler disposed within the internal cavity of the inflatable member, said filler maintaining opposing walls of said inflatable member in spaced relation to each other to thereby maintain an air space between said opposing walls.

18. The improvement of claim 17, wherein the filler functions to inhibit the inflatable member from collapsing when the inflating device is not being operated to inflate the inflatable member.

* * * * *